United States Patent [19]

Yoshifuji

[11] Patent Number: 5,032,837
[45] Date of Patent: Jul. 16, 1991

[54] METHOD FOR EXPANDING N×N THREE-STAGE SWITCHING NETWORK TO 2N×2N THREE-STAGE SWITCHING NETWORK

[75] Inventor: Yuuki Yoshifuji, Tokyo, Japan

[73] Assignee: NEC Corporation, Tokyo, Japan

[21] Appl. No.: 416,260

[22] Filed: Oct. 3, 1989

[30] Foreign Application Priority Data

Oct. 3, 1988 [JP] Japan .................................. 63-247455

[51] Int. Cl.$^5$ ........................... H04B 1/00; H04Q 1/00
[52] U.S. Cl. ........................... 340/825.8; 340/825.03; 340/826
[58] Field of Search ...................... 340/825.02, 825.79, 340/825.8, 826, 827, 825.03, 425; 379/271, 272, 273, 274; 370/16, 59, 63

[56] References Cited

U.S. PATENT DOCUMENTS

| | | | |
|---|---|---|---|
| 4,394,541 | 4/1983 | Seiden | 340/825.79 |
| 4,400,627 | 8/1983 | Zola | 340/825.8 |
| 4,417,245 | 11/1983 | Melas et al. | 340/825.8 |
| 4,807,280 | 2/1989 | Posner et al. | 340/826 |

Primary Examiner—Donald J. Yusko
Assistant Examiner—Dervis Magistre
Attorney, Agent, or Firm—Foley & Lardner

[57] ABSTRACT

N/n first-stage switches of an existing N×N three stage network are decomposed into 2N/n virtual switches having n inlets and 2n outlets, and N/n third-stage switches are likewise decomposed into 2N/n virtual switches having 2n inlets and n outlets. The outlets of each first-stage virtual switch are connected respectively to the inlets of different second stage existing switches, the inlets of each third-stage virtual switch being connected respectively to the outlets of different second stage existing switches. When expansion stages are installed, existing connections from the outlets of the N/n first-stage virtual switches are removed and new connections are established therefrom to the inlets of different expansion second-stage switches, and existing connections to the inlets of the N/n third-stage virtual switches are removed and new connections are established therefrom to the outlets of different expansion second-stage switches. New connections from the outlets of the expansion first-stage switches to the inlets of different second stage existing switches and to the inlets of differnet expansion second-stage switches are established, and new connections from the inlets of the expansion third-stage switches to the outlets of different second stage existing switches and to the outlets of different expansion second-stage switches are established. The first and third stages virtual switches are then composed into the original physical switches.

8 Claims, 5 Drawing Sheets

METHOD FOR EXPANDING N×N THREE-STAGE SWITCHING NETWORK TO 2N×2N THREE-STAGE SWITCHING NETWORK

BACKGROUND OF THE INVENTION

The present invention relates generally to space division switching networks, and more particularly to a method for installing expansion switching stages to an existing switching network to accommodate an increasing volume of traffic.

As is well known in the telephone switching art, a strictly nonblocking N by N three-stage switching network can be realized when the number of second-, or center-stage switches is equal to $2n-1$, (where n is the number of inlets to each of the individual switches of the first and third stages) provided that each individual switch is nonblocking. Therefore, the number of center-stage switches for a strictly nonblocking 2N by 2N three stage network is equal to $4n-1$.

FIG. 1 illustrates a conventional, strictly nonblocking N by N three stage switching network in which the inlets and outlets are partitioned into N/n groups of n inlets and n outlets each. The first switching stage 1 is N/n units of $n \times (2n-1)$ of matrix switches $1_1$ through $1_{N/n}$ where each one of the $(2n-1)$ outputs is connected to one of the $(2n-1)$ units of matrix switches $2_1$ through $2_{2N-1}$ of the second, center stage 2. The third stage 3 consists of N/n units of $(2n-1) \times n$ matrix switches $3_1$ through $3_{N/n}$. All center stage switches are of N/n by N/n configuration that provide connections from any first stage switch 1 to any third stage switch 3. If it is desired to double the capacity of the N by N network of FIG. 1, the resultant, strictly nonblocking 2N by 2N switching network would be of a configuration as illustrated in FIG. 2 in which the inlets and outlets are partitioned into N/n groups of 2n inlets and 2n outlets each. The first stage of the 2N by 2N three stage switching network is made up of N/n units of $2n \times (4n-1)$ matrix switches $4_1$ through $4_{N/n}$ where each one of the $(4n-1)$ outputs leads to one of the $(4n-1)$ units of center stage switches $5_1$ through $5_{4N-1}$. The third stage 6 comprises N/n units of $(4n-1) \times 2n$ switches $6_1$ through $6_{N/n}$. As in FIG. 1, all center-stage switches of the FIG. 2 arrangement are of N/n by N/n configuration to provide connections from any first stage switch 4 to any third-stage switch 6. It is seen that center-stage switches $5_1$ through $5_{2n-1}$ correspond to center-stage switches $2_1$ through $2_{2n-1}$ of FIG. 1 and therefore, it is not necessary to replace them with new switches. Because of the substantially different structures and wiring configurations, all the first and third stage switches of the strictly nonblocking N×N network must be replaced with the first and third stage switches of a strictly nonblocking 2N×2N network. However, the replacement would cause interruptions of service.

SUMMARY OF THE INVENTION

It is therefore an object of the present invention to provide a method for expanding an N×N three stage switching network to a 2N×2N three-stage switching network without replacing the switches of the first and second stages with new switches of corresponding stages.

According to a first aspect of the present invention, the N by N three-stage switching network comprises N/n existing first-stage switches each having 2n inlets and 4n outlets, 2n existing second-stage switches each having N/n inlets, and N/n outlets and N/n units of existing third-stage switches each having 4n inlets and 2n outlets. The outlets of each of the existing first-stage switches are divided into first and second groups and the inlets of each of the existing third-stage switches are likewise divided into first and second groups. The outlets of each of the first and second groups of the first stage switches are connected respectively to the inlets of different ones of the second stage existing switches and the inlets of each of the first and second groups of the third-stage switches are connected respectively to the outlets of different ones of the second stage existing switches. To the existing network is added an expansion network which is identical in switch configuration to the existing one. Existing connections leading from the outlets of the second groups of the first stage switches are then removed and new connections from the outlets of the second groups of the first stage switches to the inlets of different ones of the expansion second-stage switches are established, and existing connections leading to the inlets of the second groups of the third stage switches are removed and new connections from the inlets of the second groups of the third stage switches to the outlets of different ones of the expansion second-stage switches are established. New connections from the outlets of the expansion first-stage switches to the inlets of different ones of the second stage existing switches and to the inlets of different ones of the expansion second-stage switches are established, and new connections from the inlets of the expansion third-stage switches to the outlets of different ones of the second stage existing switches and to the outlets of different ones of the expansion second-stage switches are established.

According to a second aspect, the existing first-stage switches are decomposed into 2N/n first-stage virtual switches each having n inlets and 2n outlets and the existing third-stage switches are decomposed into 2N/n third-stage virtual switches each having 2n inlets and n outlets. The outlets of each one of the first-stage virtual switches are connected respectively to the inlets of different ones of the second stage existing switches, the inlets of each one of the third stage virtual switches being connected respectively to the outlets of different ones of the second stage existing switches. When the expansion stages are installed, existing connections leading from the outlets of the N/n first-stage virtual switches are removed and new connections from the outlets of the N/n first-stage virtual switches to the inlets of different ones of the expansion second-stage switches are established, and existing connections leading to the inlets of the N/n third-stage virtual switches are removed and new connections from the inlets of the N/n units of the third stage virtual switches to the outlets of different ones of the expansion second-stage switches are established. New connections from the outlets of the expansion first-stage switches to the inlets of different ones of the second stage existing switches and to the inlets of different ones of the expansion second-stage switches are established, and new connections from the inlets of the expansion third-stage switches to the outlets of different ones of the second stage existing switches and to the outlets of different ones of the expansion second-stage switches are established. The 2N/n first-stage virtual switches are then composed into the N/n existing first-stage switches, and the 2N/n third-stage virtual switches are composed into the N/n existing third-stage switches.

BRIEF DESCRIPTION OF THE DRAWINGS

The present invention will be described in further detail with reference to the accompanying drawings, in which.

DETAILED DESCRIPTION

Figure 1:
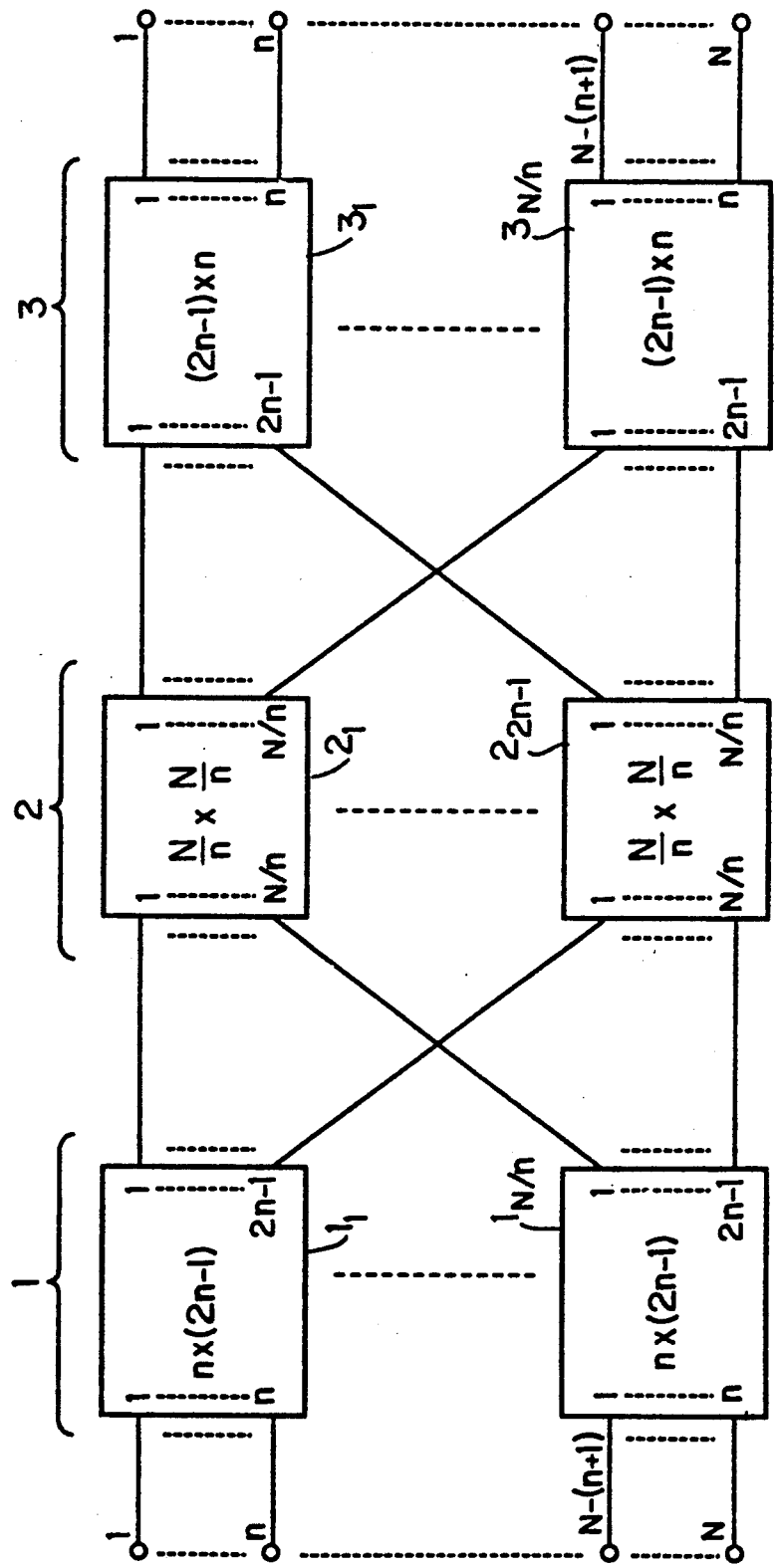
FIG. 1 is a block diagram of a conventional, strictly nonblocking N by N three stage switching network.
Figure 2:
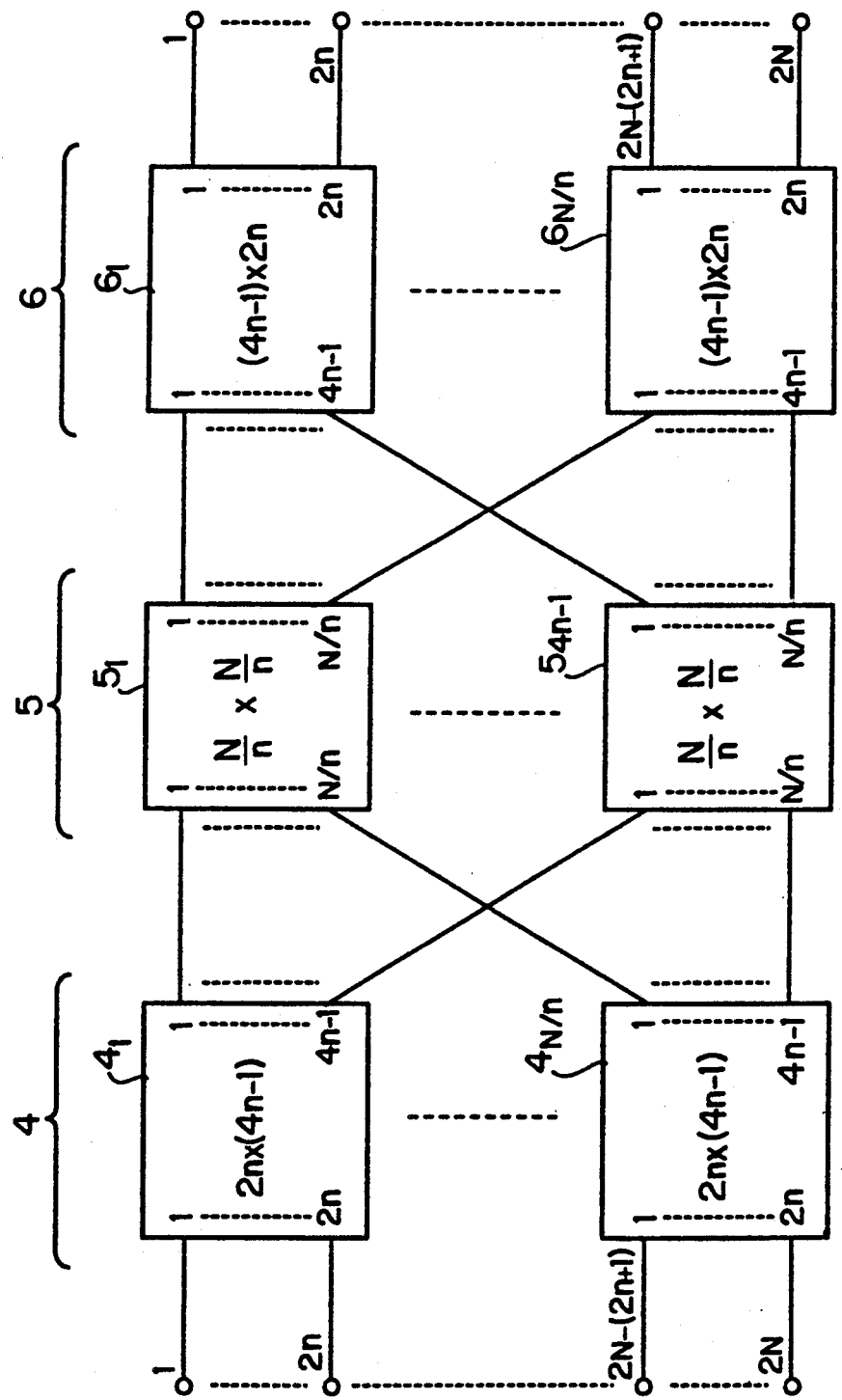
FIG. 2 is a block diagram of a conventional, strictly nonblocking 2N by 2N three stage switching network.
Figure 3:
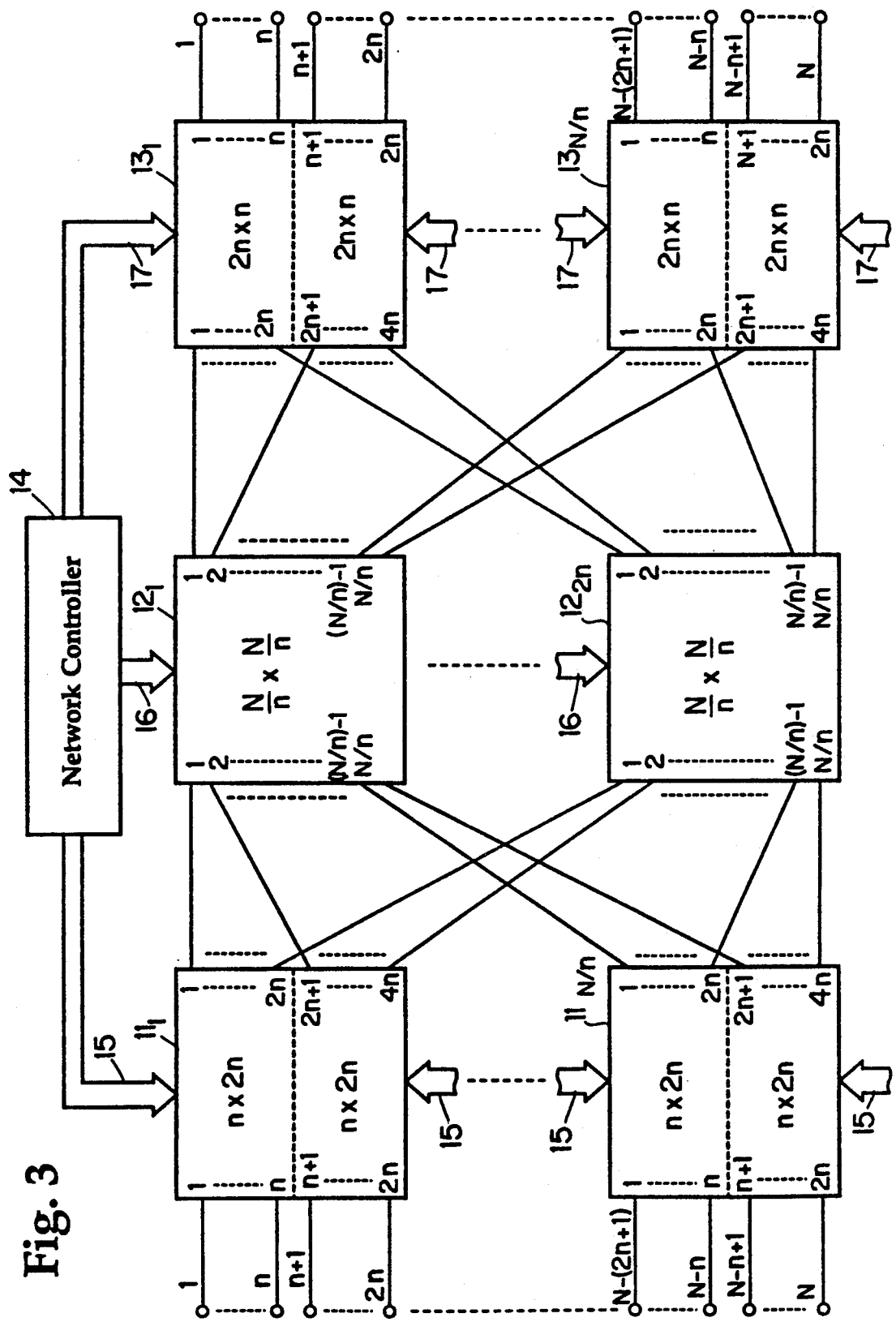
FIG. 3 is a block diagram of strictly nonblocking N by N three stage switching network according to the present invention.

Referring now to FIG. 3, there is shown a strictly nonblocking N by N three-stage switching network of the present invention which enables reconfiguration of the whole structure to a 2N by 2N network without replacing any existing switches. The inlets and outlets of the network are partitioned into N/n groups of 2n inlets and 2n outlets each. The first stage of the switching network comprises N/n units of 2n×4n cross-connects or switches $11_1$ through $11_{N/n}$. Each of the first-stage switches 11 is divided into two n×2n virtual switches. The inlets of each switch 11 is partitioned into a first group of inlets 1 through n of the upper virtual switch and a second group of inlets n+1 through 2n of the lower virtual switch, and the outlets of each switch 11 is partitioned into a first group of outlets 1 through 2n of the upper virtual switch and a second group of outlets 2n+1 through 4n of the lower virtual switch. The crosspoints of each virtual switch of the first stage are identified by a $\log_2(n \times 2n)$-bit signal supplied on a bus 15 from a network controller 14 so that any one of the inlets 1 through n of each first stage switch is connected to any one of the outlets 1 through 2n of the switch and any one of the inlets n+1 through 2n of the switch is connected to any one of the outlets 2n+1 through 4n of the switch.

The outlets 1 through 2n of the first stage switch $11_1$ are connected to the inlets 1 of (N/n) by (N/n) center stage switches $12_1$ through $12_{2n}$, respectively, and the outlets 2n+1 through 4n of switch $11_1$ are connected to the inlets 2 of the switches $12_1$ through $12_{2n}$, respectively. Likewise, the outlets 1 through 2n of the first stage switch $11_{N/n}$ are connected to the inlets (N/n)−1 of the switches $12_1$ through $12_{2n}$, respectively, and the outlets 2n+1 through 4n of the switch $11_{N/n}$ are connected to the inlets N/n of the switches $12_1$ through $12_{2n}$, respectively. The crosspoints of each of the center stage switch 12 are identified by a $\log_2(N/n)^2$-bit signal supplied on a bus 16 from the controller 14 so that any one of the inlets 1 through N/n of each of the center stage switches is connected to any one of the outlets 1 through N/n of the switch.

The third stage of the network is made up of (N/n) units of 4n×2n switches $13_1$ through $13_{N/n}$. In a manner similar to the first stage switches, each of the third stage switches 13 is divided into two 2n×n virtual switches. The inlets of each third stage switch 13 is partitioned into a first group of inlets 1 through 2n of the upper virtual switch and a second group of inlets 2n+1 through 4n of the lower virtual switch, and the outlets of each switch 13 is partitioned into a first group of outlets 1 through n of the upper virtual switch and a second group of outlets n+1 through 2n of the lower virtual switch. The inlets 1 through 2n of the third-stage switch $13_1$ are connected to the outlets 1 of the center stage switches $12_1$ through $12_{2n}$, respectively, and the inlets 2n+1 through 4n of the switch $13_1$ are connected to the inlets 2 of the center stage switches $12_1$ through $12_{N/n}$, respectively. Likewise, the inlets 1 through 2n of the third stage switch $13_{N/n}$ are connected to the outlets (N/n)−1 of the center stage switches $12_1$ through $12_{2n}$, respectively, and the inlets 2n+1 through 4n of the switch $13_{N/n}$ are connected to the inlets N/n of the center stage switches $12_1$ through $12_{N/n}$, respectively. The crosspoints of each virtual switch of the third stage are identified by a $\log_2(2n \times n)$-bit signal on bus 17 from the controller 14 so that any one of the inlets 1 through 2n of each of the third stage switches 13 is connected to any one of the outlets 1 through n of the switch and any one of the inlets 2n+1 through 4n of the third stage switch is connected to any one of the outlets n+1 through 2n of the switch.

Therefore, the upper virtual switches of all first-stage switches are connected to the odd-numbered inlets of all center-stage switches and the lower virtual switches of all first stage switches are connected to the even-numbered inlets of all center stage switches. Likewise, the upper virtual switches of all third stage switches are connected to the odd-numbered outlets of all center stage switches and the lower virtual switches of all third stage switches are connected to the even-numbered outlets of all center stage switches.

Figure 4:
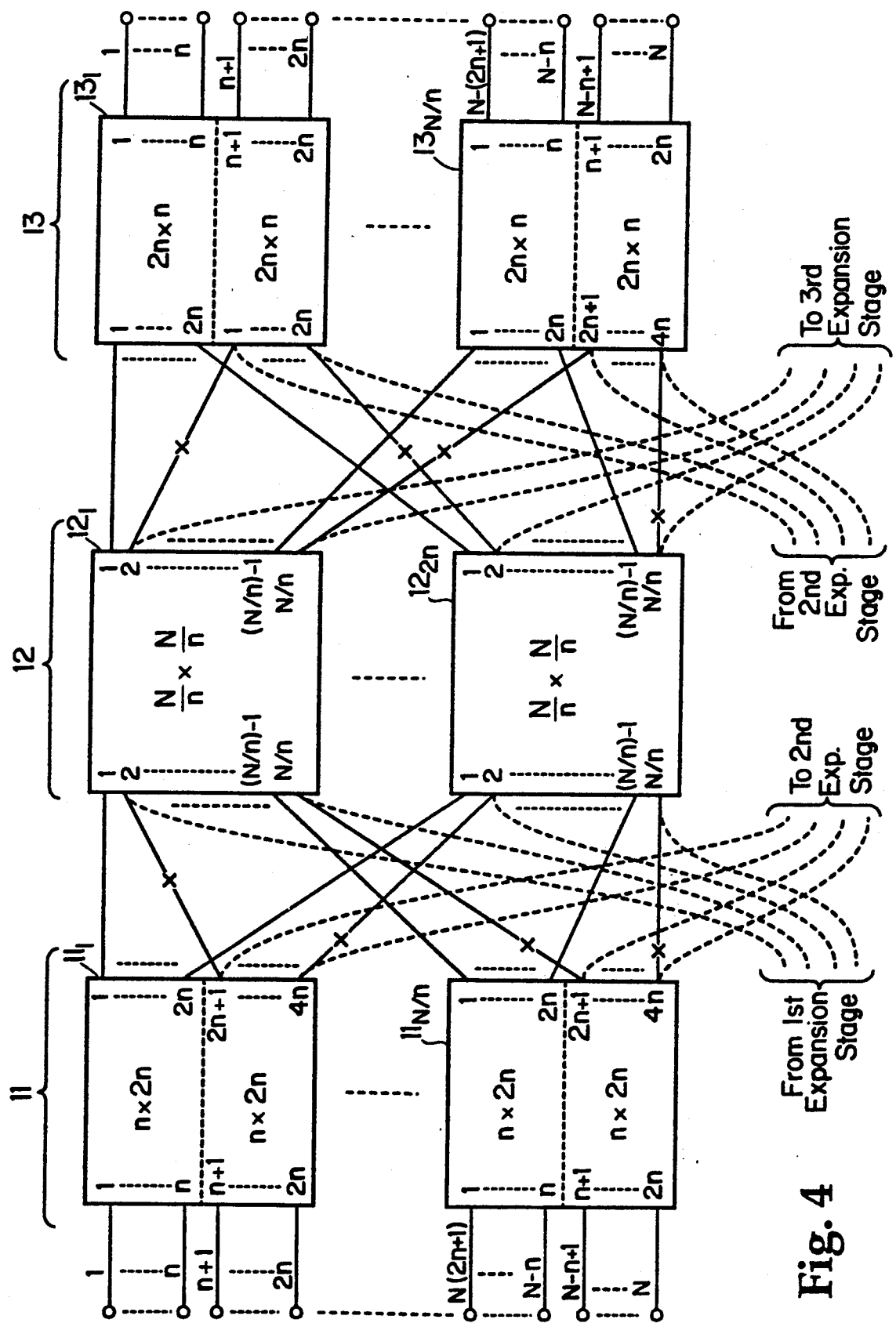
FIG. 4 is a block diagram of the N by N three stage switching network of FIG. 3, showing existing connections to be removed and new connections to be laid to and from expansion stages.

When adding expansion stages to an existing three-stage network of FIG. 3, existing connections leading from the outlets 2n+1 through 4n of each first stage switch 11 and those leading to the inlets 2n+1 through 4n of each third stage switch 13 are removed as marked by symbol "x" in FIG. 4 and replaced with new connections to and from the expansion stages as indicated by dotted lines. The upper and lower virtual units of each of the first stage switches are resolved into an integral switch of 2n×4n configuration by identifying their crosspoints with a $\log_2(2n \times 4n)$-bit signal from the controller 14 so that any one of the inlets 1 through 2n of each first stage switch is connected to any one of the outlets 1 through 4n of the first stage switch is connected to any one of the outlets 1 through 4n of the first stage switch. Likewise, the upper and lower virtual units of each of the third stage switches are resolved into a physical switch of 4n×2N configuration by identifying its crosspoints with a $\log_2(4n \times 2n)$-bit signal from the controller 14 so that any one of the inlets 1 through 4n of each third-stage switch is connected to any one of the outlets 1 through 2n of the third-stage switch.

Figure 5:
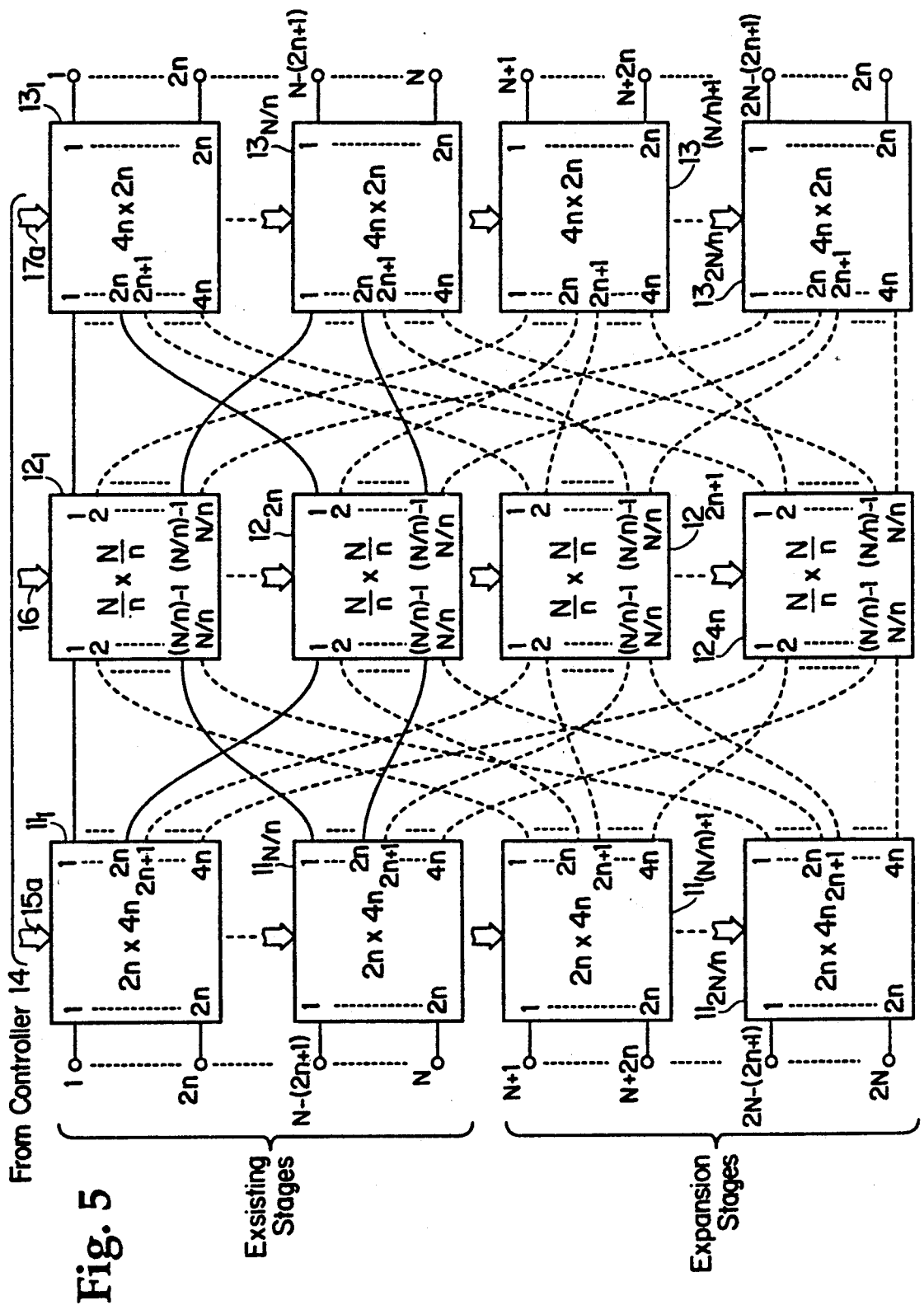
FIG. 5 is a block diagram of a strictly nonblocking 2N by 2N three stage switching network after expansion stages are added to the existing network of FIG. 3 in a manner according to the present invention.

As illustrated in FIG. 5, new connections between the existing network and the expansion stages and interconnections within the expansion stages are indicated by dotted lines. More specifically, the outlets 2n+1 through 4n of the first stage switch $11_1$ are connected to the inlets 1 of the center expansion stage switches $12_{2n+1}$ through $12_{4n}$, respectively, and the outlets 2n+1 through 4n of the existing first stage switch $11_{N/n}$ are connected to the inlets $(N/n)-1$ of expansion center stage switches $12_{2n+1}$ through $12_{4n}$, respectively. The outlets 1 through 4n of an expansion first stage switch $11_{(N/n)+1}$ are connected to the inlets 2 of center stage switches $12_1$ through $12_{4n}$, respectively, and the outlets 1 through 4n of an expansion first stage switch $11_{2N/n}$ are connected to the inlets N/n of center stage switches $12_1$ through $12_{4n}$, respectively.

In a similar manner, the inlets $2n+1$ through 4n of the third stage switch $13_1$ are connected to the outlets 1 of the center expansion stage switches $12_{2n+1}$ through $12_{4n}$, respectively, and the inlets $2n+1$ through 4n of the third stage switch $13_{N/n}$ are connected to the outlets $(N/n)-1$ of the expansion center stage switches $12_{2n+1}$ through $12_{4n}$, respectively. The inlets 1 through 4n of an expansion third stage switch $13_{(N/n)+1}$ are connected to the outlets 2 of center stage switches $12_1$ through $12_{4n}$, respectively, and the inlets 1 through 4n of an expansion third stage switch $13_{2N/n}$ are connected to the outlets N/n of center stage switches $12_1$ through $12_{4n}$, respectively.

In this way, the existing first stage switches $11_1$ through $11_{N/n}$ are connected to odd-numbered inlets of all center stage switches, and the expansion first stage switches $11_{(N/n)+1}$ through $11_{2N/n}$ are connected to even-numbered inlets of all center stage switches. Likewise, the existing third stage switches $13_1$ through $13_{N/n}$ are connected to odd-numbered outlets of all center stage switches, and the expansion third stage switches $13_{(N/n)+1}$ through $13_{2N/n}$ are connected to even-numbered outlets of all center stage switches.

It can be seen from the foregoing that the $N \times N$ three stage network of the invention has one more center stage switch than is required to achieve strictly nonblocking operation. If the center stage switches are provided as many as $2n-1$ to meet the minimum requirement of strictly nonblocking operation, the first and third stages would have to be constructed of $2n \times (4n-2)$ and $(4n-2) \times 2n$ switches, respectively. However, it is apparent that a three stage network composed of such first- and third-stage switches falls short of the strictly nonblocking requirement. The provision of the extra center stage switch thus allows the first and third stages to be constructed of $2n \times 4n$ and $4n \times 2n$ switches, respectively, as described above. The first- and third-stage switches of the present invention can therefore be easily decomposed into virtual switches of half size for operation until expansion is needed and the virtual switches can be easily composed into the original physical structure when expansion is required.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A method for expanding an existing N by N three-stage switching network to a 2N by 2N three-stage switching network, said N by N three stage switching network comprising N/n existing first-stage switches each having 2n inlets and 4n outlets, 2n existing second-stage switches each having N/n inlets and N/n outlets, and N/n existing third-stage switches each having 4n inlets and 2n outlets, the outlets of each of said existing first-stage switches being divided into first and second equal groups and the inlets of each of said existing third-stage switches being divided into first and second equal groups, the outlets of each existing first-stage switch of said first group being connected respectively to first inlets of each existing second stage switch, the outlets of each existing first-stage switch of said second group being connected respectively to second inlets of each existing second-stage switch, the inlets of each existing third-stage switch of said first group being connected respectively to first outlets of, each existing second-stage switch and the inlets of each existing third-stage switch of said second group being connected respectively to second outlets of each existing second-stage switch, the method comprising:

a) adding to said existing network, N/n expansion first-stage switches each having 2n inlets and 4n outlets, 2n expansion second-stage switches each having N/n inlets and N/n outlets, and N/n expansion third-stage switches each having 4n inlets and 2n outlets the outlets of each expansion first-stage switch being divided into first and second equal groups and the inlets of each expansion third-stage switch being divided into first and second equal groups;

b) removing existing connections leading from the outlets of existing first-stage switch of said second group and establishing new connections from the outlets of each existing first-stage switch of the second group respectively to first inlets of each expansion second-stage switch, and removing existing connections leading to the inlets of each existing third-stage switch of the second group and establishing new connections from the inlets of each existing third-stage switch of the second group respectively to first outlets of each expansion second-stage switch; and c) establishing new connections from the outlets of each expansion first-stage switch of the first group respectively to second inlets of each existing second-stage switch and from the outlets of each expansion first-stage switch of the second group respectively to second inlets of each expansion second-stage switch, and establishing new connections from the inlets of each expansion third-stage switch of the first group respectively to second outlets of each existing second-stage switch and from the inlets of each expansion third-stage switch of the second group respectively to second outlets of each expansion second-stage switch.

2. A method as claimed in claim 1, wherein said first inlets of each existing second-stage switch are odd-numbered inlets of the existing second-stage switch and said second inlets of each existing second-stage switch are even-numbered inlets of the existing second-stage switch, and said first outlets of each existing second-stage switch are odd-numbered outlets of the existing second-stage switch and said second outlets of each existing second-stage switch are even-numbered outlets of the existing second-stage switch, and wherein said first inlets of each expansion second-stage switch are odd-numbered inlets of the expansion second-stage switch and said second inlets of each expansion second-stage switch are even-numbered inlets of the expansion second-stage switch, and said first outlets of each expansion second-stage switch are odd-numbered outlets of the expansion second-stage switch and said second outlets of each expansion second-stage switch are even-numbered outlets of the expansion second-stage switch.

3. A method for expanding an existing N by N three-stage switching network to a 2N by 2N three-stage switching network, said N by N three-stage switching network comprising N/n existing first-stage switches each having 2n inlets and 4n outlets, 2n existing second-stage switches each having N/n inlets and N/n outlets, said existing first-stage switches being decomposed into first and second equal groups of first-stage virtual switches each having n inlets and 2n outlets and said existing third-stage switches being decomposed into first and second equal groups of third-stage virtual switches each having 2n inlets and n outlets, the outlets of each first-stage virtual switch of said first group being connected respectively to first inlets of each existing second-stage switch, the outlets of each first-stage virtual switch of said second group being connected respectively to second inlets of each existing second-stage switch, the inlets of each third-stage virtual switch of said first group being connected respectively to first outlets of each existing second-stage switch, and the inlets of each third-stage virtual switch of said second group being connected respectively to second outlets of each existing second-stage switch, the method comprising:

a) adding to said existing network, N/n expansion first-stage switches each having 2n inlets and 4n outlets, 2n expansion second-stage switches each having N/n inlets and N/n outlets, and N/n expansion third-stage switches each having 4n inlets and 2n outlets;

b) decomposing said expansion first-stage switches into first and second equal groups of expansion first-stage virtual switches and decomposing said expansion third-stage switches into first and second equal groups of expansion third-stage virtual switches;

c) removing existing connections leading from the outlets of said first-stage virtual switches of said first group and establishing new connections from the outlets of each existing first-stage virtual switch of said second group respectively to first inlets of each expansion second-stage switch, and removing existing connections leading to the inlets of said third-stage virtual switches of said second group and establishing new connections from the inlets of each existing third-stage virtual switch of said second group respectively to first outlets of each expansion second-stage switch;

d) establishing new connections from the outlets of each expansion first-stage virtual switch of said first group to second inlets of each existing each existing second-stage switch and new connections from the outlets of each expansion first-stage virtual switch of said second group to second inlets of each expansion second-stage switch, and establishing new connections from the inlets of each expansion third-stage virtual switch of said first group to second outlets of each existing second-stage switch and new connections from the inlets of each expansion third-stage virtual switch of said second group to second outlets of each existing second-stage switch; and e) composing the existing first-stage virtual switches of said first and second groups into the N/n existing first-stage switches, composing the existing third-stage virtual switches of said first and second groups into the N/n existing third-stage switches, composing the expansion first-stage virtual switches of said first and second groups into said N/n expansion first-stage switches and composing the expansion third-stage virtual switches of said first and second groups into said N/n expansion third-stage switches.

4. A method as claimed in claim 3, wherein said first inlets of each existing second-stage switch are odd-numbered inlets of the existing second-stage switch and said second inlets of each existing second-stage switch are even-numbered inlets of the existing second-stage switch, and said first outlets of each existing second-stage switch are odd-numbered outlets of the existing second-stage switch and said second outlets of each existing second-stage switch are even-numbered outlets of the existing second-stage switch, and wherein said first inlets of each expansion second-stage switch are odd-numbered inlets of the expansion second-stage switch and said second inlets of each expansion second-stage switch are even-numbered inlets of the expansion second-stage switch, and said first outlets of each expansion second-stage switch are odd-numbered outlets of the expansion second-stage switch and said second outlets of each expansion second-stage switch are even-numbered outlets of the expansion second-stage switch.

5. A method for expanding an existing N by N three-stage switching network to a 2N by 2N three-stage switching network, said N by N three-stage switching network comprising N/n existing first-stage switches each having 2n inlets and 4n outlets, 2n existing second-stage switches each having N/n inlets and N/n outlets and N/n existing third-stage switches each having 4n inlets and 2n outlets, the method comprising:

(a) dividing the outlets of each of said existing first-stage switches into first and second equal groups and dividing the inlets of each of said existing third-stage switches into first and second equal groups;

(b) connecting the outlets of each existing first-stage switch of said first group respectively to first inlets of each existing second-stage switch, connecting the outlets of each existing first-stage switch of said second group respectively to second inlets of each existing second-stage switch, connecting the inlets of each existing third-stage switch of said first group respectively to first outlets of each existing second-stage switch;

c) adding to said existing network, N/n expansion first-stage switches each having 2n inlets and 4n outlets, 2n expansion second-stage switches each having N/n inlets and N/n outlets, and N/n expansion third-stage switches each having 4n inlets and 2n outlets;

d) dividing the outlets of each of said expansion first-stage switches into first and second equal groups and dividing the inlets of each of said expansion third-stage switches into first and second equal groups;

e) removing existing connections leading from the outlets of each existing first-stage switch of the second group and establishing new connections from the outlets of each existing third-stage switch of the second group respectively to first inlets of each expansion second-stage switch, and removing existing connections leading to the inlets of each existing third-stage switch of the second group respectively and establishing new connections from the inlets of each existing third-stage switch of the second group to first outlets of each expansion second-stage switch; and f) establishing new connections from the outlets of each expansion first-stage switch of the first group respectively to second inlets of each existing second-stage switch, establishing new connections from the outlets of each expansion first-stage switch of the second group respectively to second inlets of each expansion second-stage switch, establishing new connections from the inlets of each expansion third-stage switch of the first group respectively to second outlets of each existing second-stage switch and establishing new connections from the inlets of each expansion third-stage switch of the second group respectively to second outlets of each expansion second-state switch.

6. A method as claimed in claim 5, wherein said first inlets of each existing second-stage switch are odd-numbered inlets of the existing second-stage switch and said second inlets of each existing second-stage switch are even-numbered inlets of the existing second-stage switch, and said first outlets of each existing second-stage switch are odd-numbered outlets of the existing second-stage switch and said second outlets of each existing second-stage switch are even-numbered outlets of the existing second-stage switch, and wherein said first inlets of each expansion second-stage switch are odd-numbered inlets of the expansion second-stage switch and second inlets of each expansion second-stage switch are even-numbered inlets of the expansion second-stage switch, and said first outlets of each expansion second-stage switch are odd-numbered outlets of the expansion second-stage switch and said second outlets of each expansion second-stage switch are even-numbered outlets of the expansion second-stage switch.

7. A method for expanding an existing N by N three-stage switching network to a 2N by 2N three-stage switching network, said N by N three-stage switching network comprising N/n existing first-stage switches each having 2n inlets and 4n outlets, 2n existing second-stage switches each having N/n inlets and N/n outlets and N/n existing third-stage switches each having 4n inlets and 2n outlets, the method comprising:

a) decomposing said existing first-stage switches into first and second equal groups of existing first-stage virtual switches each having n inlets and 2n outlets and decomposing said existing third-stage switches into first and second equal groups of existing third-stage virtual switches each having 2n inlets and n outlets;

b) connecting the outlets of each existing first-stage virtual switch of the first group respectively to first inlets of each existing second-stage switch, connecting the outlets of each existing first-stage virtual switch of the second group respectively to second inlets of each existing second-stage switch, connecting the inlets of each existing third-stage virtual switch of the first group respectively to first outlets of each existing second-stage switch, and connecting the inlets of each existing third-stage switch of the second group respectively to second outlets of each existing second-stage switch;

c) adding to said existing network, N/n expansion first-stage switches each having 2n inlets and 4n outlets, 2n expansion second-stage switches each having N/n inlets and N/n outlets, and N/n expansion third-stage switches each having 4n inlets and 2n outlets;

d) decomposing said expansion first-stage switches into first and second equal groups of expansion first-stage virtual switches each having n inlets and 2n outlets and decomposing said expansion third-stage switches into first and second equal groups of expansion third-stage virtual switches each having 2n inlets and n outlets;

e) removing existing connections leading from the outlets of each first-stage virtual switch of the second group and establishing new connections from the outlets of each first-stage virtual switch of the second group respectively to first inlets of each expansion second-stage switch, and removing existing connections leading to the inlets of each existing third-stage virtual switch of the second group and establishing new connections from the inlets of each existing third-stage virtual switch of the second group respectively to first outlets of each expansion second-stage switch;

f) establishing new connections from the outlets of each expansion first-stage virtual switch of the first group respectively to inlets of each existing second-stage switch, establishing new connections from the outlets of each expansion first-stage virtual switch of the second group respectively to second inlets of each expansion second-stage switch, establishing new connections from the inlets of each expansion third-stage virtual switch of the first group respectively to second outlets of each existing second-stage switch, and establishing new connections from the inlets of each expansion third-stage virtual switch of the second group to second outlets of each expansion second-stage switch; and g) composing the existing first-stage virtual switches of said first and second groups into the N/n existing first-stage switches, composing the existing third-stage virtual switches of said first and second groups into the N/n existing third-stage switches, composing the expansion first-stage virtual switches of said first and second groups into the N/n expansion first-stage switches, and composing the expansion third-stage virtual switches of said first and second groups into the N/n expansion third-stage switches.

8. A method as claimed in claim 7, wherein said first inlets of each existing second-stage switch are odd-numbered inlets of the existing second-stage switch and said second inlets of each existing second-stage switch are even-numbered inlets of the existing second-stage switch, and said first outlets of each existing second-stage switch are odd-numbered outlets of the existing second-stage switch and said second outlets of each existing second-stage switch are even-numbered outlets of the existing second-stage switch, and wherein said first inlets of each expansion second-stage switch are odd-numbered inlets of the expansion second-stage switch and said second inlets of each expansion second-stage switch are even-numbered inlets of the expansion second-stage switch, and said first outlets of each expansion second-stage switch are odd-numbered outlets of the expansion second-stage switch and said second outlets of each expansion second-stage switch are even-numbered outlets of the expansion second-stage switch.

* * * * *